United States Patent
Bifulco et al.

(10) Patent No.: US 11,566,564 B2
(45) Date of Patent: Jan. 31, 2023

(54) ACOUSTICALLY TREATED PANELS

(71) Applicant: RAYTHEON TECHNOLOGIES CORPORATION, Farmington, CT (US)

(72) Inventors: Anthony R. Bifulco, Ellington, CT (US); Duncan R. C. Lee, Plano, TX (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/308,715

(22) Filed: May 5, 2021

(65) Prior Publication Data
US 2022/0010731 A1    Jan. 13, 2022

Related U.S. Application Data

(60) Provisional application No. 63/049,354, filed on Jul. 8, 2020.

(51) Int. Cl.
*F02C 7/24* (2006.01)
*G10K 11/16* (2006.01)

(52) U.S. Cl.
CPC .............. *F02C 7/24* (2013.01); *G10K 11/16* (2013.01); *F05D 2220/32* (2013.01); *F05D 2220/36* (2013.01); *F05D 2240/123* (2013.01); *F05D 2250/75* (2013.01); *F05D 2260/963* (2013.01)

(58) Field of Classification Search
CPC . F05D 2260/963; G10K 11/172; B64D 33/06; F02C 7/24
See application file for complete search history.

(56) References Cited

U.S. PATENT DOCUMENTS 3,819,009 A      6/1974   Motsinger
4,298,090 A  *  11/1981  Chapman ............. G10K 11/172
                                                             181/292
(Continued)

FOREIGN PATENT DOCUMENTS

CN        107437411 A  * 12/2017 ................ F02C 7/24
CN        109595650 A  *  4/2019 ................ F02C 7/24
(Continued)

OTHER PUBLICATIONS

Howerton, B. et al. Development and Validation of an Interactive Liner Design and Impedance Modeling Tool by 18th AIAA/CEAS Aeroacoustics Conference (33rd AIAA Aeroacoustics Conference). Jun. 4-6, 2012, Colorado Springs, Colo. (Year: 2012).*

(Continued)

*Primary Examiner* — Topaz L. Elliott
(74) *Attorney, Agent, or Firm* — Snell & Wilmer L.L.P.

(57) ABSTRACT

A system for dampening noise generated by a gas turbine engine is disclosed. In various embodiments, the system includes a fan exit guide vane having a leading edge, a trailing edge and a pocket that extends in a chordwise direction between the leading edge and the trailing edge; and an acoustic panel configured to be received within the pocket, the acoustic panel including a back sheet, a face sheet and a core disposed between the back sheet and the face sheet, the core having a first cavity extending between a first wall and a second wall and a second cavity disposed within the first cavity.

19 Claims, 4 Drawing Sheets

(56) References Cited

U.S. PATENT DOCUMENTS

| | | | | |
|---|---|---|---|---|
| 4,645,032 | A * | 2/1987 | Ross | F02C 7/24 |
| | | | | 181/224 |
| 5,905,234 | A * | 5/1999 | Tsukamoto | G10K 11/16 |
| | | | | 181/292 |
| 6,021,612 | A * | 2/2000 | Dunn | G10K 11/172 |
| | | | | 181/290 |
| 7,018,172 | B2 | 3/2006 | Prasad et al. | |
| 7,334,998 | B2 | 2/2008 | Jones et al. | |
| 7,607,287 | B2 | 10/2009 | Reba et al. | |
| 9,514,734 | B1 * | 12/2016 | Jones | E04B 1/86 |
| 9,623,952 | B1 * | 4/2017 | Jones | B64C 9/18 |
| 10,107,191 | B2 | 10/2018 | Gilson et al. | |
| 11,208,193 | B2 * | 12/2021 | Ravise | G10K 11/168 |
| 2006/0024154 | A1 * | 2/2006 | Costa | F02C 7/045 |
| | | | | 415/170.1 |
| 2006/0104819 | A1 * | 5/2006 | Jones | F01D 5/16 |
| | | | | 416/233 |
| 2008/0253885 | A1 * | 10/2008 | Foose | F02K 3/06 |
| | | | | 415/208.2 |
| 2008/0295518 | A1 * | 12/2008 | Reba | F02C 7/24 |
| | | | | 60/725 |
| 2013/0142624 | A1 * | 6/2013 | Julliard | G10K 11/175 |
| | | | | 181/292 |
| 2019/0120143 | A1 * | 4/2019 | Zhang | F01N 1/00 |
| 2019/0161157 | A1 * | 5/2019 | Ravise | G10K 11/172 |
| 2019/0304428 | A1 * | 10/2019 | Sandiford | B64D 33/02 |

FOREIGN PATENT DOCUMENTS

| | | |
|---|---|---|
| EP | 1998003 | 12/2008 |
| EP | 3869499 | 8/2021 |
| EP | 3896269 | 10/2021 |
| GB | 2361035 | 10/2001 |
| GB | 2471845 | 1/2011 |
| WO | 2005100753 | 10/2005 |

OTHER PUBLICATIONS

European Patent Office, European Search Report dated Nov. 8, 2021 in Application No. 21181789.5.

Jones, Michael G. and Howerton, Brian M., "Evaluation of Novel Liner Concepts for Fan and Airframe Noise Reduction", http://arc.aiaa.org | DOI: 10.2514/6.2016-2787, AIAA Paper 2016-2787, Aeroacoustics Conferences, May 30-Jun. 1, 2016, Lyon, France, 22nd AIAA/CEAS Aeroacoustics Conference, pp. 1-18.

* cited by examiner

ACOUSTICALLY TREATED PANELS

CROSS-REFERENCE TO RELATED APPLICATIONS

This application claims priority to, and the benefit of, Provisional Patent Application No. 63/049,354, filed Jul. 8, 2020 and titled "ACOUSTICALLY TREATED FAN STRUT," which is incorporated herein by reference in its entirety for all purposes.

FIELD

The present disclosure relates to noise control for gas turbine engines and, more particularly, to acoustically treated panels, such as fan exit guide vanes or struts, having acoustic impedance control features for attenuating or dampening noise in gas turbine engines.

BACKGROUND

Gas turbine engines often include a bypass duct, especially engines used for commercial aerospace applications. A fan assembly can draw air into the engine, and a portion of that air is diverted through the bypass duct. Fan exit guide vanes (FEGVs) extend into the bypass duct downstream of the fan assembly. These FEGVs provide an aerodynamic function in straightening or otherwise interacting with airflow from the fan assembly, and a structural function in delivering mechanical support in a generally radial direction across the bypass duct.

However, noise produced by gas turbine engines is a concern. Noise generated by fan-wake/vane interaction is a significant contributor to the effective perceived noise level (EPNL) of gas turbine engines. Such noise problems can occur when wakes of the upstream fan assembly impinge on the FEGVs, thereby providing a mechanism for converting non-acoustic vortical disturbances (e.g., the fan wake) into propagating pressure disturbances (e.g., sound).

Various solutions have been proposed to address these concerns. For instance, active noise control using vane-mounted actuators, and the use of vane sweep and lean to introduce radial phase cancellation are known, but such systems are often undesirably complex. Also, acoustic bypass duct liners are known for dampening noise along the fan bypass duct, but such liners can be undesirably large. In addition, engine systems can be designed to mitigate fan-wake/vane interaction by: (a) increasing axial spacing between the fan assembly and the FEGVs to increase decay of a wake velocity deficit, (b) selecting a sufficiently high ratio of FEGVs to fan assembly blades such that, for the associated blade-passing frequency, spinning modes generated by the fan-wake/vane interacting are "cut-off" and cannot transmit acoustic power all the way through the length of the bypass duct, and (c) utilizing a relatively long bypass duct. These solutions undesirably constrain fan assembly, fan case and FEGV structural design, and can dictate a longer bypass duct that would otherwise be desired.

SUMMARY

A system for dampening noise generated by a gas turbine engine is disclosed. In various embodiments, the system includes a fan exit guide vane having a leading edge, a trailing edge and a pocket that extends in a chordwise direction between the leading edge and the trailing edge; and an acoustic panel configured to be received within the pocket, the acoustic panel including a back sheet, a face sheet and a core disposed between the back sheet and the face sheet, the core having a first cavity extending between a first wall and a second wall and a second cavity disposed within the first cavity.

In various embodiments, a first plurality of openings extends through the face sheet and into the first cavity. In various embodiments, a second plurality of openings extends through the face sheet and into the second cavity. In various embodiments, the first cavity is configured to form a first Helmholtz resonator configured to dampen a first resonant frequency. In various embodiments, the second cavity is configured to form a second Helmholtz resonator configured to dampen a second resonant frequency.

In various embodiments, the first cavity is characterized by a first length in the chordwise direction of the fan exit guide vane and wherein the second cavity is characterized by a second length in the chordwise direction, the second length being less than the first length. In various embodiments, the first cavity is characterized by a first depth extending between a suction side and a pressure side of the fan exit guide vane and wherein the second cavity is characterized by a second depth extending between the suction side and the pressure side of the fan exit guide vane, the second depth being less than the first depth.

In various embodiments, the first cavity is characterized by a first length in a spanwise direction of the fan exit guide vane and wherein the second cavity is characterized by a second length in the spanwise direction, the second length being less than the first length. In various embodiments, the first cavity is characterized by a first depth extending between a suction side and a pressure side of the fan exit guide vane and wherein the second cavity is characterized by a second depth extending between the suction side and the pressure side of the fan exit guide vane, the second depth being less than the first depth.

In various embodiments, the first cavity includes a first side, the first side being integrated within the first wall and the second cavity includes a second side, the second side being integrated within the first wall. In various embodiments, the first cavity defines an L-shaped space between the first wall and the second wall. In various embodiments, the first cavity and the second cavity are configured to extend in a spanwise direction of the fan exit guide vane. In various embodiments, the second length is equal to about three-fourths of the first length. In various embodiments, the second depth is equal to about one-half of the first depth.

An acoustic panel is disclosed. In various embodiments, the acoustic panel includes a back sheet; a face sheet; and a core disposed between the back sheet and the face sheet, the core having a first cavity extending between a first wall and a second wall and a second cavity disposed within the first cavity.

In various embodiments, a first plurality of openings extends through the face sheet and into the first cavity. In various embodiments, a second plurality of openings extends through the face sheet and into the second cavity. In various embodiments, the first cavity is configured to form a first Helmholtz resonator configured to dampen a first resonant frequency. In various embodiments, the second cavity is configured to form a second Helmholtz resonator configured to dampen a second resonant frequency. In various embodiments, the first cavity defines an L-shaped space between the first wall and the second wall and the second cavity defines a rectangular shaped space between the first wall and the second wall.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

In general, the present disclosure provides airfoil acoustic impedance control to help attenuate (or dampen) noise within a gas turbine engine. More particularly, the present invention relates to features of a fan exit guide vane (FEGV) that dampen pressure disturbances (e.g., sound) by tuning the acoustic impedance of the FEGV to modify unsteady aerodynamic response such that noise produced by fan wakes interacting with the FEGV is reduced. The present disclosure provides noise dampening in a relatively simple and lightweight manner, and, in various embodiments, in an entirely passive manner. Moreover, the use of an acoustic impedance control panel (or an acoustic panel) attached to the FEGV according to the present invention is advantageous for fabrication and assembly.

Figure 1:
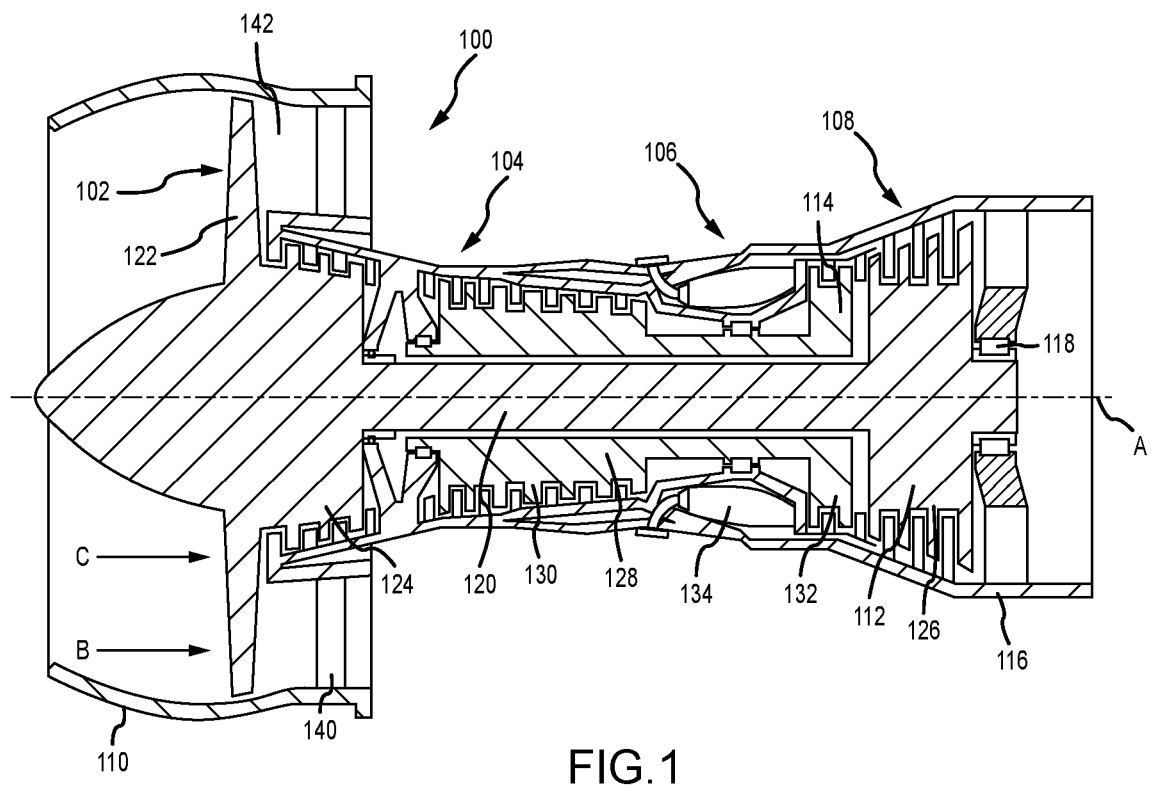
FIG. 1 is a schematic representation of a gas turbine engine, in accordance with various embodiments.

Referring now to the drawings, FIG. 1 schematically illustrates a gas turbine engine 100, in accordance with various embodiments. The gas turbine engine 100 is disclosed herein as a two-spool turbofan that generally incorporates a fan section 102, a compressor section 104, a combustor section 106 and a turbine section 108. The fan section 102 drives air along a bypass flow path B in a bypass duct defined within a nacelle 110, while the compressor section 104 drives air along a primary or core flow path C for compression and communication into the combustor section 106 and then expansion through the turbine section 108. Although depicted as a two-spool turbofan gas turbine engine in the disclosed non-limiting embodiment, it will be understood that the concepts described herein are not limited to use with two-spool turbofans, as the teachings may be applied to other types of gas turbine engines, including, for example, architectures having three or more spools or only a single spool.

The gas turbine engine 100 generally includes a low speed spool 112 and a high speed spool 114 mounted for rotation about an engine central longitudinal axis A relative to an engine static structure 116 via several bearing systems 118. It should be understood that various bearing systems at various locations may alternatively or additionally be provided and the location of the several bearing systems 118 may be varied as appropriate to the application. The low speed spool 112 generally includes an inner shaft 120 that interconnects a fan 122, a low pressure compressor 124 and a low pressure turbine 126. The inner shaft 120 may be directly connected to the fan 122 or through a speed change mechanism, such as, for example, a fan drive gear system configured to drive the fan 122 at a lower speed than that of the low speed spool 112. The high speed spool 114 generally includes an outer shaft 128 that interconnects a high pressure compressor 130 and a high pressure turbine 132. A combustor 134 is arranged in the gas turbine engine 100 between the high pressure compressor 130 and the high pressure turbine 132. The inner shaft 120 and the outer shaft 128 are concentric and rotate via the several bearing systems 118 about the engine central longitudinal axis A, which is collinear with longitudinal axes of the inner shaft 120 and the outer shaft 128.

The air in the core flow path C is compressed by the low pressure compressor 124 and then the high pressure compressor 130, mixed and burned with fuel in the combustor 134, and then expanded over the high pressure turbine 132 and the low pressure turbine 126. The low pressure turbine 126 and the high pressure turbine 132 rotationally drive the respective low speed spool 112 and the high speed spool 114 in response to the expansion. It will be appreciated that each of the positions of the fan section 102, the compressor section 104, the combustor section 106, the turbine section 108, and the fan drive gear system, if present, may be varied. For example, the fan drive gear system may be located aft of the combustor section 106 or even aft of the turbine section 108, and the fan section 102 may be positioned forward or aft of the location of the fan drive gear system.

Still referring to FIG. 1, a plurality of fan exit guide vanes (FEGVs) 140 extend across a bypass duct 142 downstream of the fan 122 and in a generally radially-oriented direction.

The plurality of FEGVs 140 provide, among other things, an aerodynamic function in straightening or otherwise interacting with airflow from the fan 122, and a structural (or mechanical support) function across the bypass duct 142. During operation of the gas turbine engine 100, the fan 122 may produce a wake, which can comprise non-acoustic vortical disturbances, that can impinge upon the plurality of FEGVs 140. Noise, typically in the range of about 2-3 kHz, can be generated by interaction between the fan wake and the plurality of FEGVs 140, which provides a mechanism for converting the fan wake into propagating pressure disturbances (e.g., sound). Such fan-wake/FEGV interactions can be a significant contributor to the effective perceived noise level (EPNL) of the gas turbine engine 100. The present disclosure helps to attenuate or dampen such noise, thereby helping to reduce the EPNL of the gas turbine engine 100.

Figure 2A:
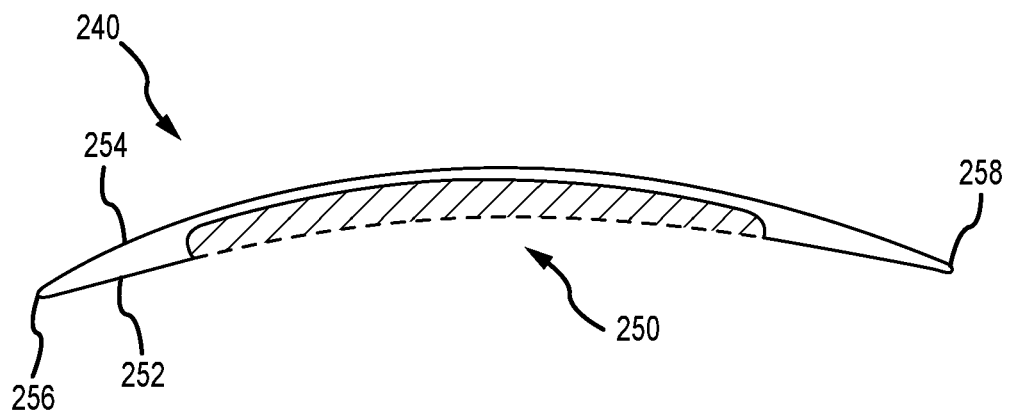
FIG. 2A is a schematic representation of a fan exit guide vane having a cassette insert, in accordance with various embodiments.
Figure 2B:
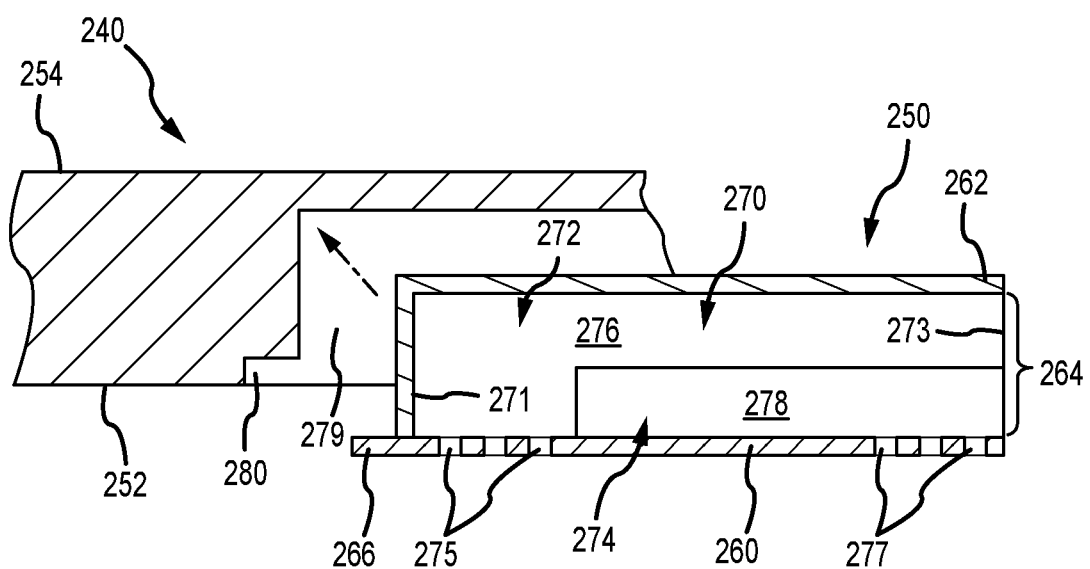
FIG. 2B is an exploded cross-sectional view of a portion of a fan exit guide vane and an acoustic panel, in accordance with various embodiments.

FIGS. 2A and 2B are schematic views of a FEGV 240 having an acoustic panel 250 attached thereto. As illustrated in FIG. 2A, the FEGV 240 has an airfoil shape that defines a pressure side 252 (or a concave pressure side) and a suction side 254 (or a convex pressure side) opposite the pressure side 252, as well as a leading edge 256 and a trailing edge 258 opposite the leading edge 256. The acoustic panel 250 is attached to the FEGV 240 at the pressure side 252 at a location intermediate the leading edge 256 and the trailing edge 258. In various embodiments, the acoustic panel can be attached to the FEGV 240 at other locations, such as, for example, the suction side 254. As will become apparent below, in various embodiments, the acoustic panel is configured to extend longitudinally along the span of the FEGV 240.

Referring now to FIG. 2B, with continued reference to FIG. 2A, an exploded cross-sectional view of a portion of the FEGV 240 and the acoustic panel 250 is provided. The view in FIG. 2B is highly schematic and does not show the actual curvature of the FEGV 240 along the pressure side 252 and the suction side 254. In various embodiments, the acoustic panel 250 includes a face sheet 260, a back sheet 262, a core 264 located between the face sheet 260 and the back sheet 262, and an attachment flange 266. The components of the acoustic panel 250 can be made from materials well-known for aerospace applications. In the illustrated embodiment, the face sheet 260 is perforated, the back sheet 262 is non-perforated, and the core 264 comprises a multi-cavity structure 270 (e.g., a structure forming a plurality of cavities that extend longitudinally along a length of the acoustic panel 250), or a plurality of multi-cavity structures. For example, and as will be described more fully below, each multi-cavity structure 270 includes a first cavity 272 that extends between a first wall 271 and a second wall 273, the second wall 273 being spaced a distance from the first wall 271, typically in a chordwise direction or a spanwise direction of the FEGV 240, and a second cavity 274 that is disposed within the first cavity 272. In various embodiments, the face sheet 260 includes a first plurality of openings 275 that extend into the first cavity 272, thereby forming a first Helmholtz resonator 276. Similarly, the face sheet 260 includes a second plurality of openings 277 that extend into the second cavity 274, thereby forming a second Helmholtz resonator 278, characterized by acoustic dampening properties different from the first Helmholtz resonator 276. For example, in various embodiments, the first Helmholtz resonator 276 is configured to dampen a first resonant frequency and the second Helmholtz resonator 278 is configured to dampen a second resonant frequency.

Still referring to FIGS. 2A and 2B, the FEGV 240 includes a pocket 279 shaped to receive the acoustic panel 250 having an attachment region 280. The FEGV 240 is typically a solid vane, that is, it does not have internal cavities or passages such as film cooling holes. However, in various embodiments, internal cavities may be present in the FEGV 240. The FEGV 240 can be formed in a conventional manner, and the pocket 279 can be formed by removing material of the FEGV 240 using known machining processes. When assembled together, the acoustic panel 250 is at least partially inserted into the pocket 279 of the FEGV 240. The back sheet 262 can be positioned toward the suction side 254 of the FEGV 240 and the face sheet 260 can be positioned substantially flush with the pressure side 252 of the FEGV 240. The attachment flange 266 of the acoustic panel 250 can be positioned in the attachment region 280 of the pocket 279, and secured using screws, adhesive, or other suitable fastening means. The present disclosure thus allows the FEGV 240 and the acoustic panel 250 to be fabricated separately, and later assembled in a relatively simple manner. This provides numerous advantages for fabrication and assembly. Moreover, it is possible to retrofit the acoustic panel 250 onto existing FEGVs that have had the pocket 279 machined out.

Figure 3A:
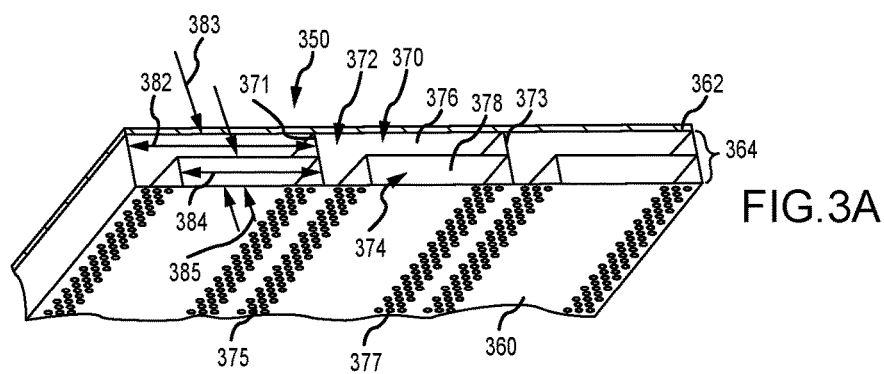
FIG. 3A is a perspective view of an acoustic panel, in accordance with various embodiments.
Figure 3B:
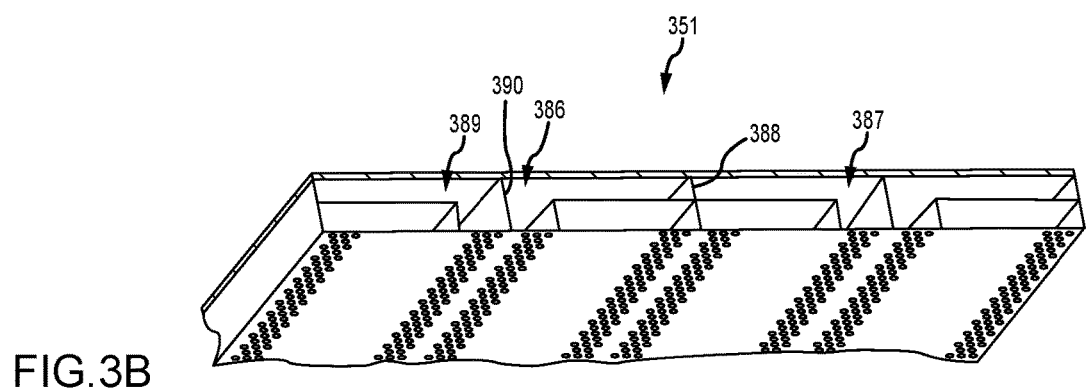
FIG. 3B is a perspective view of an acoustic panel, in accordance with various embodiments.

Referring now to FIGS. 3A and 3B, various embodiments of an acoustic panel are illustrated, in accordance with various embodiments. Referring to FIG. 3A, for example, a first acoustic panel 350 is illustrated having three multi-cavity structures, with each multi-cavity structure having a dual-cavity configuration. For example, and similar to the foregoing description, the first acoustic panel 350 includes a face sheet 360, a back sheet 362, and a core 364 located between the face sheet 360 and the back sheet 362. In the illustrated embodiment, the face sheet 360 is perforated, the back sheet 362 is non-perforated, and the core 364 comprises a multi-cavity structure 370 (e.g., a structure forming a plurality of cavities that extend longitudinally along a length of the first acoustic panel 350), or a plurality of multi-cavity structures (three are illustrated). Each multi-cavity structure 370 includes a first cavity 372 that extends between a first wall 371 and a second wall 373, the second wall 373 being spaced a distance from the first wall 371, typically in a chordwise direction or a spanwise direction of an FEGV (e.g., the FEGV 240 described above), and a second cavity 374 that is disposed within the first cavity 372. In various embodiments, the face sheet 360 includes a first plurality of openings 375 that extend into the first cavity 372, thereby forming a first Helmholtz resonator 376, and a second plurality of openings 377 that extend into the second cavity 374, thereby forming a second Helmholtz resonator 378, characterized by acoustic dampening properties different from the first Helmholtz resonator 376. Similar to the above description, in various embodiments, the first Helmholtz resonator 376 is configured to dampen a first resonant frequency and the second Helmholtz resonator 378 is configured to dampen a second resonant frequency.

Referring still to FIG. 3A, each of the multi-cavity structures (e.g., the multi-cavity structure 370) may be characterized by one or more relative dimensions. For example, the first cavity 372 of each of the multi-cavity structures is defined by a first length 382 ($L_1$) and a first depth 383 ($D_1$). Similarly, the second cavity 374 of each of the multi-cavity structures is defined by a second length 384 ($L_2$) and a second depth 385 ($D_2$). Because the second cavity 374 is disposed within the first cavity 372, and because each of the cavities is substantially rectangular in cross section, the shape of the first cavity 372 (or the first Helmholtz resonator 376) forms a substantially L-shaped space in cross section, while the shape of the second cavity 374 (or the second Helmholtz resonator 378) forms a substantially rectangular shaped space in cross section. Using the dimensions of the first cavity 372 as a reference, in various embodiments, the size of the second cavity 374 may range from 0.6 $L_1<L_2<0.9 L_1$; or, in various embodiments, $0.7 L_1<L_2<0.8$ Li; or, in various embodiments, $L_2≈0.75 L_1$. Similarly, in various embodiments, the size of the second cavity 374 may range from $0.3 D_1<D_2<0.7 D_1$; or, in various embodiments, $0.4 D_1<D_2<0.6 D_1$; or, in various embodiments, $D_2≈0.50 D_1$.

While each of the multi-cavity structures illustrated in FIG. 3A appear identical in relative size (i.e., each of $L_1$, $L_2$, $D_1$ and $D_2$ appear identical), it is noted the disclosure contemplates the size of each of the first cavity 372 and the second cavity 374 among the plurality of multi-cavity structures may vary relative to each other. Further, as indicated in FIG. 3B, it is noted with reference to a second acoustic panel 351 that each of the multi-cavity structures (e.g., a first multi-cavity structure 386 and a second multi-cavity structure 387) may have different orientations among a plurality of multi-cavity structures. For example, as illustrated, the first multi-cavity structure 386 and the second multi-cavity structure 387 are oriented as mirror images of each other with respect to a first wall 388 that separates the two multi-cavity structures, with the second cavity within each of the structures abutting the first wall 388 (or having a side being integrated within the first wall 388). Similarly, as illustrated, the first multi-cavity structure 386 and a third multi-cavity structure 389 are oriented as mirror images of each other with respect to a second wall 390 that separates the two multi cavity structures, with the second cavity within each of the structures being spaced away from the second wall 390.

Figure 4:
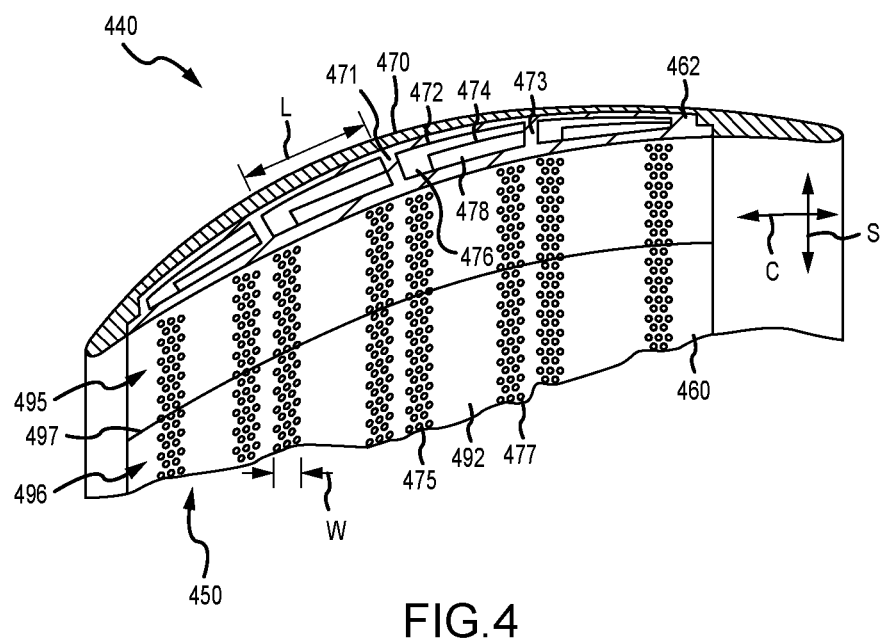
FIG. 4 is a perspective view of a portion of a fan exit guide vane having an acoustic panel, in accordance with various embodiments.

Referring now to FIG. 4, a perspective view of a portion of a FEGV 440 having an acoustic panel 450 (similar to the FEGV 240 and acoustic panel 250 described above with reference to FIGS. 2A and 2B) is illustrated. Similar to the foregoing description, the acoustic panel 450 includes a face sheet 460, a back sheet 462, and a core (comprising a plurality of multi-cavity structures) located between the face sheet 460 and the back sheet 462. In the illustrated embodiment, the face sheet 460 is perforated, the back sheet 462 is non-perforated, and the core comprises four multi-cavity structures, with each multi-cavity structure extending longitudinally along a length of the acoustic panel 450. Each multi-cavity structure, including a multi-cavity structure 470, includes a first cavity 472 that extends between a first wall 471 and a second wall 473, the second wall 473 being spaced a distance from the first wall 471 in a chordwise direction, and a second cavity 474 that is disposed within the first cavity 472. In various embodiments, the face sheet 460 includes a first plurality of openings 475 that extend into the first cavity 472, thereby forming a first Helmholtz resonator 476, and a second plurality of openings 477 that extend into the second cavity 474, thereby forming a second Helmholtz resonator 478, characterized by acoustic dampening properties different from the first Helmholtz resonator 476. Various of the characteristics of the acoustic panels described above, including, for example, the size and orientation characteristics, are applicable to the acoustic panel 450 described here so are not repeated. However, it is noted, as illustrated, that neither the first cavity 472 nor the second cavity 474 are required to be substantially rectangular or square-sided. Rather, as illustrated in FIG. 4, the disclosure contemplates cavities characterized by curved surfaces, typically to conform with the curvature of the pressure and suction sides of the FEGV 440.

Still referring to FIG. 4, it is noted the first plurality of openings 475 and the second plurality of openings 477 are typically grouped in rows with non-perforated (solid) regions 492 of the face sheet 460 located between the rows of the openings. In the illustrated embodiment, the rows, as well as the cavities, extend in a generally spanwise direction S, although in various embodiments other arrangements are possible (e.g., the rows and the cavities extend in a generally chordwise direction C or the rows and the cavities extend in an angular direction (e.g., forty-five degrees) with respect to the spanwise direction and the chordwise direction). Further, each row can have a width W, which, in one embodiment, can be about 0.635 centimeters (≈¼ inch). The various cavities (e.g., the first cavity 472) are also characterized by a length L, which, in various embodiments, is substantially parallel to the face sheet 460. In one embodiment, the first cavity 472 has a length L equal to about 2.54 centimeters (≈1 inch), with the remaining dimensions of the first cavity 472 and the second cavity 474 being determined or falling within ranges consistent with those described above with reference to FIGS. 3A and 3B. In addition, it is noted that each multi-cavity structure need not extend the entire span of the FEGV 440. For example, as illustrated, a first plurality of multi-cavity structures 495 and a second plurality of multi-cavity structures 496 may be separated by a wall 497 that extends along the acoustic panel 450 in the chordwise direction. Note also that, in various embodiments, where the cavities extend in the chordwise direction, all the relevant lengths, for example, will also run in the chordwise direction, typically between the leading edge and the trailing edge.

The foregoing disclosure provides an acoustically treated fan exit guide vane, the acoustic treatment being comprised of an array of folded cavities designed to attenuate low frequency fan noise. Each folded cavity has a perforated face sheet and a cavity, with the larger dimension of the cavities (e.g., between depth and length as defined above) being aligned roughly in the chordwise direction of the vane. Alternatively, the larger dimension of the cavities may be aligned roughly in the spanwise direction of the vane. Such alignment improves low-frequency attenuation compared to cavities that are aligned normal to the vane surface (e.g., the pressure side surface). Adjacent folded cavities have their larger dimensions opposed to each other. For example, one directed in the positive chordwise direction, and the other in the negative chordwise direction. This permits two cavities to fit within the vane thickness, thereby increasing sound attenuation. Over the vane surface, cavity dimensions may be varied in order to create a broadband liner, e.g., a liner or acoustic panel that attenuates sound over a wide range of frequencies. A benefit of adding a second cavity within a first cavity is the configuration increases the degrees of freedom of the liner or acoustic panel, allowing it to potentially attenuate a broader range of noise. This occurs without requiring an increase in volume of the existing structure of the liner or acoustic panel. Also, by doubling the number of cells, the amount of acoustically treated surface area on the face sheet is increased.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A system for dampening noise generated by a gas turbine engine, comprising:
    a fan exit guide vane having a leading edge, a trailing edge and a pocket that extends in a chordwise direction between the leading edge and the trailing edge; and
    an acoustic panel configured to be received within the pocket, the acoustic panel including a back sheet, a face sheet and a core disposed between the back sheet and the face sheet, the core having a first cavity extending between a first wall and a second wall and a second cavity disposed within the first cavity, the first cavity being configured to form a first Helmholtz resonator configured to dampen a first resonant frequency, wherein the first cavity is characterized by a first length and a first depth and the second cavity is characterized by a second length and a second depth, wherein the second length is greater than 0.6 times the first length and less than 0.9 times the first length, and wherein the second depth is greater than 0.3 times the first depth and less than or equal to 0.5 times the first depth.

2. The system of claim 1, wherein a first plurality of openings extends through the face sheet and into the first cavity.

3. The system of claim 2, wherein a second plurality of openings extends through the face sheet and into the second cavity.

4. The system of claim 1, wherein the second cavity is configured to form a second Helmholtz resonator configured to dampen a second resonant frequency.

5. The system of claim 1, wherein the first length is in the chordwise direction of the fan exit guide vane and wherein the second length is in the chordwise direction, the second length being less than the first length.

6. The system of claim 5, wherein the first depth extends between a suction side and a pressure side of the fan exit guide vane and wherein the second depth extends between the suction side and the pressure side of the fan exit guide vane, the second depth being less than the first depth.

7. The system of claim 1, wherein the first length is in a spanwise direction of the fan exit guide vane and wherein the second length is in the spanwise direction, the second length being less than the first length.

8. The system of claim 7, wherein the first cavity is characterized by a first depth extending between a suction side and a pressure side of the fan exit guide vane and wherein the second cavity is characterized by a second depth extending between the suction side and the pressure side of the fan exit guide vane, the second depth being less than the first depth.

9. The system of claim 1, wherein the first cavity includes a first side, the first side being integrated within the first wall and the second cavity includes a second side, the second side being integrated within the first wall.

10. The system of claim 9, wherein the first cavity defines an L-shaped space between the first wall and the second wall.

11. The system of claim 10, wherein the first cavity and the second cavity are configured to extend in a spanwise direction of the fan exit guide vane.

12. The system of claim 11, wherein the second length is equal to about three-fourths of the first length.

13. The system of claim 12, wherein the second depth is equal to about one-half of the first depth.

14. An acoustic panel, comprising:
a back sheet;
a face sheet; and
a core disposed between the back sheet and the face sheet, the core having a first cavity extending between a first wall and a second wall and a second cavity disposed within the first cavity, the first cavity being configured to form a first Helmholtz resonator, the first cavity having a first length and a first depth, the second cavity having a second length and a second depth, wherein the second length is greater than 0.6 times the first length and less than 0.9 times the first length, and wherein the second depth is greater than 0.3 times the first depth and less than or equal to 0.5 times the first depth.

15. The acoustic panel of claim 14, wherein a first plurality of openings extends through the face sheet and into the first cavity.

16. The acoustic panel of claim 15, wherein a second plurality of openings extends through the face sheet and into the second cavity.

17. The acoustic panel of claim 16, wherein the first Helmholtz resonator configured to dampen a first resonant frequency.

18. The acoustic panel of claim 17, wherein the second cavity is configured to form a second Helmholtz resonator configured to dampen a second resonant frequency.

19. The acoustic panel of claim 18, wherein the first cavity defines an L-shaped space between the first wall and the second wall and the second cavity defines a rectangular shaped space between the first wall and the second wall.

* * * * *